US011863864B2

(12) United States Patent
Kukita et al.

(10) Patent No.: US 11,863,864 B2
(45) Date of Patent: Jan. 2, 2024

(54) PROGRAM FOR PRESENTING PHOTOGRAPHING ORDER

(71) Applicant: DAIKIN INDUSTRIES, LTD., Osaka (JP)

(72) Inventors: Tomomi Kukita, Osaka (JP); Daisuke Satou, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/905,091

(22) PCT Filed: Jan. 29, 2021

(86) PCT No.: PCT/JP2021/003212
§ 371 (c)(1),
(2) Date: Aug. 26, 2022

(87) PCT Pub. No.: WO2021/176907
PCT Pub. Date: Sep. 10, 2021

(65) Prior Publication Data
US 2023/0098096 A1 Mar. 30, 2023

(30) Foreign Application Priority Data
Mar. 3, 2020 (JP) .................................. 2020-035937

(51) Int. Cl.
*H04N 23/60* (2023.01)
(52) U.S. Cl.
CPC .................................. *H04N 23/64* (2023.01)
(58) Field of Classification Search
CPC .. G06V 20/20; G06T 7/73; G06T 7/70; H04N 23/63; H04N 23/64; G06Q 10/063; G06Q 10/103; G06Q 50/08
See application file for complete search history.

(56) References Cited

U.S. PATENT DOCUMENTS

| 2004/0090526 A1* | 5/2004 | Watanabe | H04N 23/66 348/207.1 |
| 2012/0296463 A1* | 11/2012 | Rivers | G05B 19/19 700/114 |
| 2015/0146007 A1* | 5/2015 | Dusik | G06T 19/006 348/161 |

FOREIGN PATENT DOCUMENTS

| JP | 2000-165786 | 6/2000 |
| JP | 2004-032608 | 1/2004 |
| JP | 2004-096438 | 3/2004 |
| JP | 2007-325292 | 12/2007 |

(Continued)

OTHER PUBLICATIONS

International Preliminary Report on Patentability for PCT/JP2021/003212 dated Sep. 15, 2022.

(Continued)

*Primary Examiner* — Ahmed A Berhan
(74) *Attorney, Agent, or Firm* — IPUSA, PLLC

(57) ABSTRACT

According to the present disclosure, a photographer is guided so that all construction phots can be taken. A program according to one embodiment of the present disclosure causes a terminal to function as: an information acquiring part configured to acquire an item to be photographed and the order in which the item is to be photographed, the item indicating a photographing object and what stage of construction the photographing object is in; and a presenting part configured to present the item and the order.

12 Claims, 11 Drawing Sheets

(56) References Cited

FOREIGN PATENT DOCUMENTS

| | | |
|---|---|---|
| JP | 2013-125535 | 6/2013 |
| JP | 2013-164786 | 8/2013 |
| JP | 2017-215850 | 12/2017 |
| JP | 2018-106439 | 7/2018 |

OTHER PUBLICATIONS

International Search Report for PCT/JP2021/003212 dated Apr. 20, 2021.
Extended European search report for EP21764962.3 dated Jul. 14, 2023.

* cited by examiner

FIG.6

| EQUIPMENT | | EQUIPMENT A | EQUIPMENT B | EQUIPMENT C |
|---|---|---|---|---|
| STEP 1. JOB: COVERING OF ROOM | BEFORE | 1 | 13 | 16 |
| | DURING | 2 | 14 | 17 |
| | AFTER | 3 | 15 | 18 |
| STEP 2. JOB: REMOVAL OF EXISTING AIR CONDITIONER | BEFORE | 4 | 19 | – |
| | DURING | 5 | 20 | – |
| | AFTER | 6 | 21 | – |
| STEP 3. JOB: INSTALLATION OF NEW AIR CONDITIONER | BEFORE | 7 | 22 | 23 |
| | DURING | 8 | 24 | 25 |
| | AFTER | 9 | 26 | 27 |
| STEP 4. JOB: REMOVAL OF COVERING OF ROOM | BEFORE | 10 | 28 | 29 |
| | DURING | 11 | 30 | 31 |
| | AFTER | 12 | 32 | 33 |

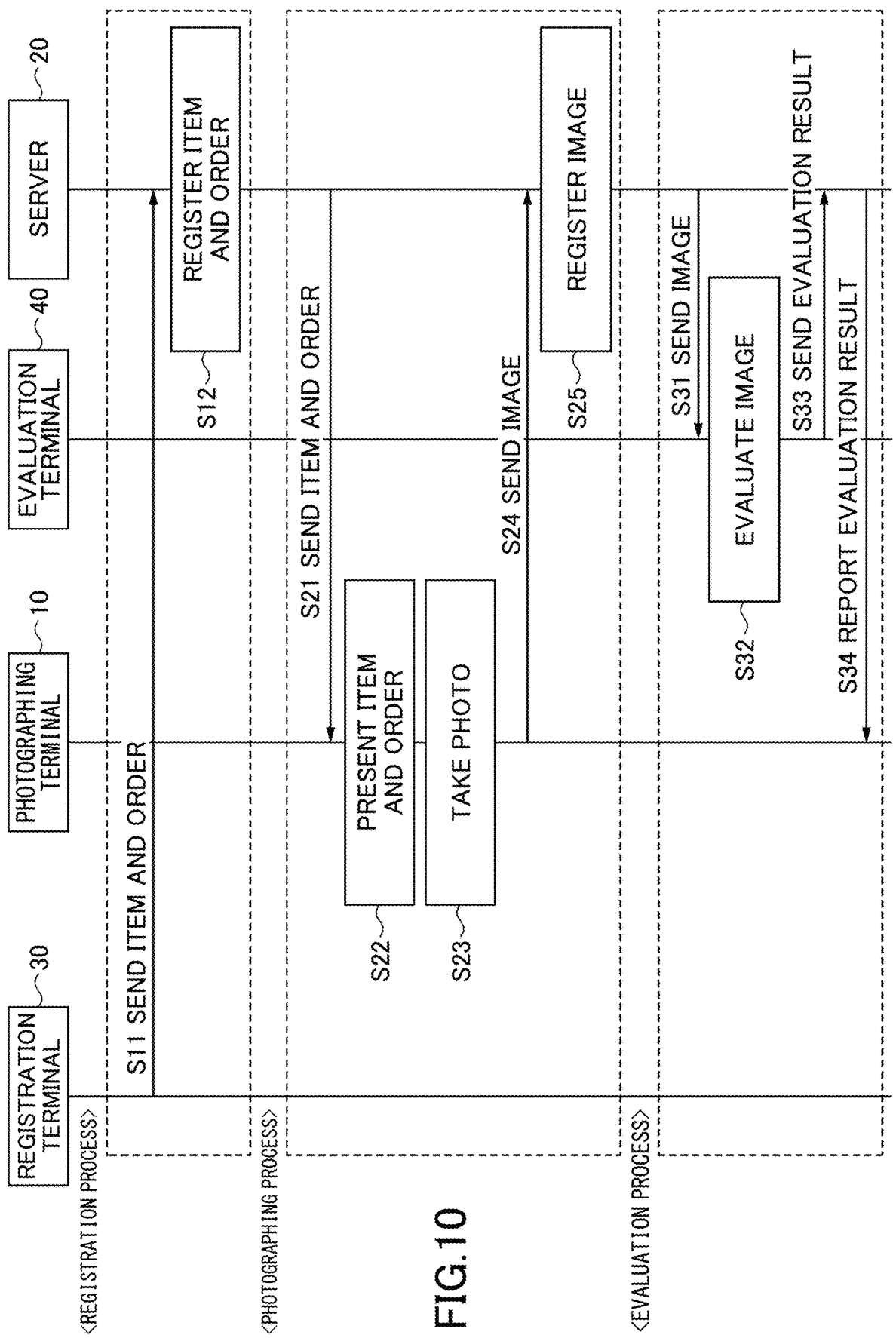

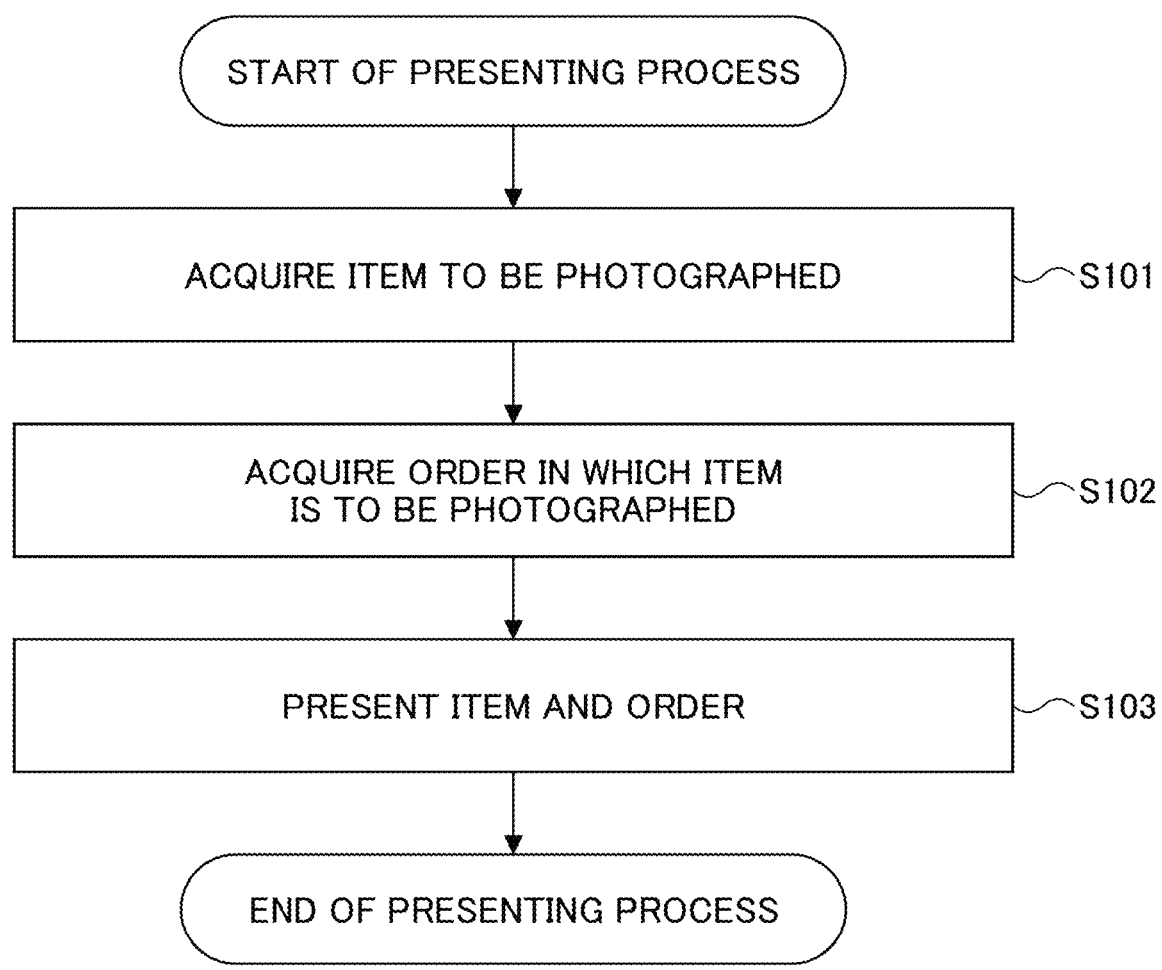

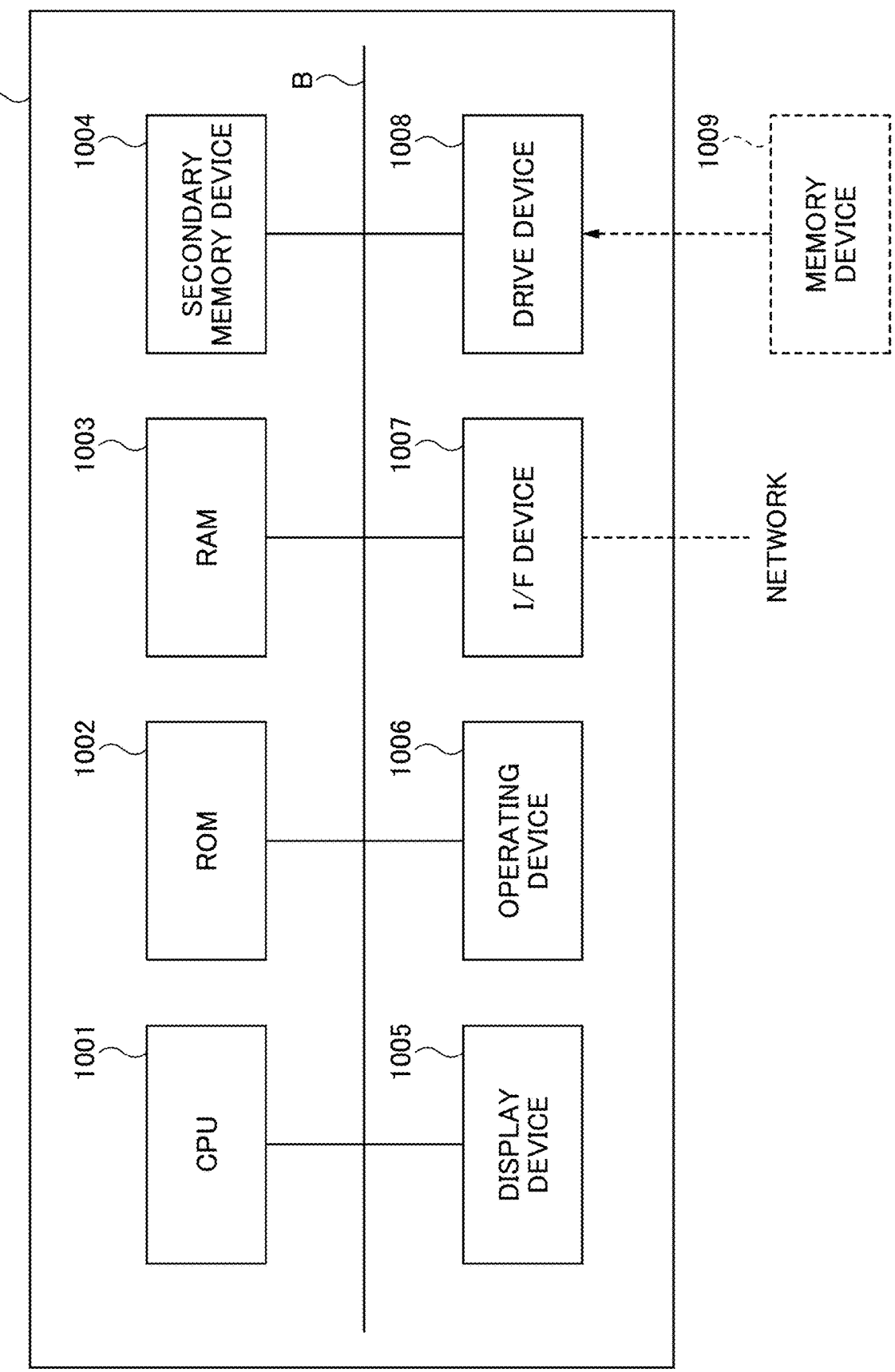

PROGRAM FOR PRESENTING PHOTOGRAPHING ORDER

TECHNICAL FIELD

The present disclosure relates to a program for presenting a photographing order.

BACKGROUND ART

Conventionally, when equipment such as an air conditioner is installed, construction photos are taken at the site of construction. The person who takes the photos photographs the individual steps of construction (for example, the step of cutting a hole in the ceiling, the step of installing the equipment such as an air conditioner, etc.), photographs the job stages of each step (for example, before the step is performed, while the step is being performed, after the step is performed, etc.), and so forth.

RELATED-ART DOCUMENT

Patent Document

Patent Document 1: Unexamined Japanese Patent Application Publication No. 2018-106439

SUMMARY OF THE INVENTION

Problem to be Solved by the Invention

However, if the photographer forgets to take a construction photo at the timing when it should be taken, it may not be possible to take that construction photo anymore. For example, if the photographer forgets to take a photo of the step of cutting a hole in the ceiling and finishes the step of installing the equipment, it is no longer possible to take a photo of the step of cutting a hole in the ceiling. Also, for example, if the photographer forgets to take a photo before the step of cutting a hole in the ceiling and finishes the step of cutting a hole in the ceiling, it is no longer possible to take a photo of before the step of cutting a hole in the ceiling. Therefore, the photographer needs to take construction photos at appropriate timings.

It is therefore an object of the present disclosure to guide the photographer to take all construction photos.

Means for Solving Problem

The program according to the first aspect of the present disclosure causes a terminal to function as: an information acquiring part configured to acquire an item to be photographed and the order in which the item is to be photographed, the item indicating a photographing object and what stage of construction the photographing object is in; and a presenting part configured to present the item and the order.

According to the first aspect of the present disclosure, the photographer can be guided to take all construction photos. Furthermore, according to the first aspect of the present disclosure, it is possible to present the photographing object of construction photos and the stage of construction the photographing object is in, in the order of photographing.

Also, based upon the program of the first aspect, according to a second aspect of the present disclosure, the presenting part displays a plurality of items in the order in which the plurality of items are to be photographed.

According to the second aspect of the present disclosure, the photographer can visually identify the order in which each of a plurality of construction photos is to be taken.

Also, based upon the program of the first aspect or the second aspect, according to a third aspect of the present disclosure, the photographing object is equipment, the stage of construction is the status of job in each step of construction, and the presenting part displays the plurality of items in the order in which the plurality of items are to be photographed, per equipment or per step.

According to the third aspect of the present disclosure, the photographer can visually identify the order in which each of a plurality of construction photos of each equipment is to be taken, or the order in which each of a plurality of construction photos of each step is to be taken.

Also, based upon the program of any one of the first aspect to the third aspect, according to a fourth aspect of the present disclosure, the presenting part presents, together with the item, the use of an image in which the item is photographed.

According to the fourth aspect of the present disclosure, the photographer can know the use of construction photos taken.

Also, based upon the program of any one of the first aspect to the fourth aspect, according to a fifth aspect of the present disclosure, the presenting part presents the item to be photographed next.

According to the fifth aspect of the present disclosure, the photographer can know which construction photo is to be taken next.

Also, based upon the program of the fifth aspect, according to a sixth aspect of the present disclosure, the presenting part presents the item to be photographed next based on the presentation method in accordance with the use of the image in which the item is photographed.

According to the sixth aspect of the present disclosure, the photographer can know the use of construction photos taken, based on differences in the presentation method.

Also, based upon the program of any one of the first aspect to the sixth aspect, according to a seventh aspect of the present disclosure, the program further causes the terminal to function as a prevention part configured to prevent the item from being photographed in an order that is different from the order presented.

According to the seventh aspect of the present disclosure, it is possible to prevent the photographer from taking construction photos in an order that is different from the order in which the photos should be taken.

Also, based upon the program of any one of the first aspect to the seventh aspect, according to an eighth aspect of the present disclosure, the program further causes the terminal to function as an association part configured to associate the item with the image in which the item is photographed.

According to the eighth aspect of the present disclosure, a construction photo that is taken can be linked with information about the order in which the construction photos to be taken are to be taken.

Also, based upon the program of any one of the first aspect to the eighth aspect, according to a ninth aspect of the present disclosure, the presenting part presents whether or not the item has been photographed.

According to the ninth aspect of the present disclosure, the photographer can know whether or not a construction photo to be taken has been taken.

Also, based upon the program of any one of the first aspect to the ninth aspect, according to a tenth aspect of the present disclosure, the program further causes the terminal to function as an image transmission part configured to send the image in which the item is photographed, to a server.

According to the tenth aspect of the present disclosure, construction photos that are taken can be saved on a server.

Also, based upon the program of the tenth aspect, according to an eleventh aspect of the present disclosure, the program further causes the terminal to function as an evaluation result receiving part configured to receive an evaluation result determined with regard to an image saved in the server.

According to the eleventh aspect of the present disclosure, when a construction photo is taken, the photographer can know its suitability.

Also, based upon the program of the eleventh aspect, according to a twelfth aspect of the present disclosure, when it is determined that the item needs to be re-photographed, the information acquiring part acquires the order in which the item is to be re-photographed.

According to the twelfth aspect of the present disclosure, it is possible to guide the photographer to take all construction photos to be retaken.

Also, based upon the program of the eleventh aspect or the twelfth aspect, according to a thirteenth aspect of the present disclosure, a notification is sent to the photographing terminal when the image in which the item is photographed is saved in the server, and a notification is sent to the photographing terminal when the evaluation result is saved in the server.

According to the thirteenth aspect of the present disclosure, the evaluator can know when a construction photo needs to be evaluated, and know when an evaluation result needs to be checked.

BRIEF DESCRIPTION OF THE DRAWINGS

FIG. 6 is a diagram for explaining the order in which individual items are to be photographed, according to one embodiment of the present disclosure;

FIG. 10 is a sequence diagram of a registration process, a photographing process, and an evaluation process according to one embodiment of the present disclosure;

FIG. 11 is a flowchart of a photographing order presenting process according to one embodiment of the present disclosure; and FIG. 12 is a diagram showing a hardware configuration of a photographing terminal, a server, a registration terminal, and an evaluation terminal according to one embodiment of the present disclosure.

EMBODIMENT FOR CARRYING OUT THE INVENTION

Now, an embodiment of the present disclosure will be described below with reference to the accompanying drawings.

<Explanation of Terms>

A "construction photo" is a photograph that is taken at the site of construction while construction is in progress. For example, an object that is constructed (hereinafter also referred to as a "construction object") is photographed. Note that a construction photo is also referred to as a "construction photo." "Equipment" is any kind of equipment that is installed at any place. For example, the equipment herein refers to the indoor unit of an air conditioner, the outdoor unit of an air conditioner, an air cleaner, and the like. To "present" means displaying a screen, outputting sounds and voices of various volumes, generating various lights of various intensities, generating various vibrations of various intensities, and so forth.

<Overall Configuration>

Figure 1:
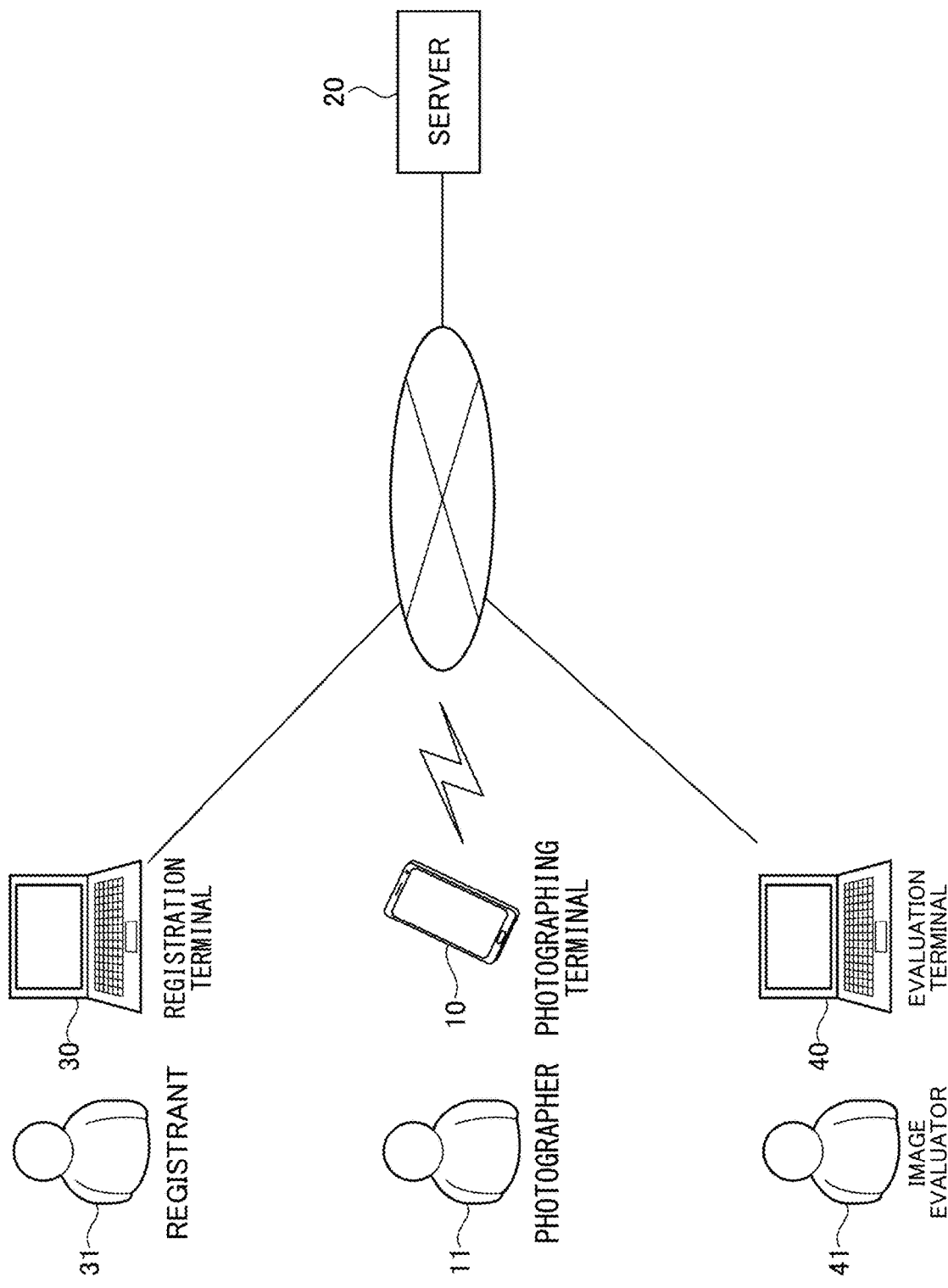
FIG. 1 is a diagram showing an overall configuration according to one embodiment of the present disclosure.

FIG. 1 is a diagram showing an overall configuration of one embodiment of the present disclosure. A construction management system 1 can include a photographing terminal 10, a server 20, a registration terminal 30, and an evaluation terminal 40. The server 20 is communicably connected with the photographing terminal 10, the registration terminal 30, and the evaluation terminal 40, via an unspecified network. Each will be described below.

<<Photographing terminal 10>>

The photographing terminal 10 is a terminal for taking a photo of a construction object. The photographing terminal 10 has a camera function. For example, the photographing terminal 10 is a smartphone, a tablet, and the like. The photographing terminal 10 acquires an item to be photographed and the order in which the item is to be photographed. Also, the photographing terminal 10 presents the item to be photographed and the order in which the item is to be photographed. Note that the person who operates the photographing terminal 10 will be hereinafter referred to as a "photographer 11." Later, the photographing terminal 10 will be described in detail with reference to FIG. 2.

<<Registration Terminal 30>>

The registration terminal 30 is a terminal for registering an item to be photographed and the order in which the item is to be photographed, with the server 20, in advance (that is, before the photographer 11 takes the construction photo). For example, the registration terminal 30 is a personal computer or the like. Note that the person who operates the registration terminal 30 will be hereinafter referred to as a "registrant 31." Later, the registration terminal 30 will be described in detail with reference to FIG. 3.

<<Evaluation Terminal 40>>

The evaluation terminal 40 is a terminal for evaluating an image that is taken by the photographing terminal 10 and saved in the server 20. For example, the evaluation terminal 40 is a personal computer or the like. Note that the person who operates the evaluation terminal 40 will be hereinafter referred to as an "image evaluator 41." Later, the evaluation terminal 40 will be described in detail with reference to FIG. 4.

<<Server 20>>

The server 20 is one or more computers. The memory device of the server 20 stores an item to be photographed and the order in which the items are to be photographed. Also, images taken by the photographing terminal are stored in the memory device of the server 20.

The server 20 receives an item to be photographed and the order in which the item is to be photographed, from the registration terminal 30. Also, the server 20 sends the item to be photographed and the order in which the item is to be photographed, to the photographing terminal 10. Later, the server 20 will be described in detail with reference to FIG. 5.

Here, what items are to be photographed will be explained. The items may include a photographing object (for example, a construction object such as equipment) and an indication of what stage of construction the photographing object is in. Note that the stage of construction may refer to each individual step of construction (that is, an item may indicate what step of construction the photographing object is in), or the stage of construction may refer to the status of job in each step of construction (that is, an item may indicate what job stage the photographing object in each step of construction is in). Each step indicates the job that constitutes that particular step of construction. For example, the steps may include the job of covering up the room, the job of removing the existing air conditioner, the job of installing a new air conditioner, the job of removing the covering of the room, and so forth. The job stage indicates the status of job in each step. For example, the job stage of a step may be before performing the step (hereinafter also referred to simply as "before"), while the step is being performed (hereinafter also referred to simply as "during"), after the step is performed (hereinafter also referred to simply as "after"), and so forth.

<Functional Blocks of Photographing Terminal 10>

Figure 2:
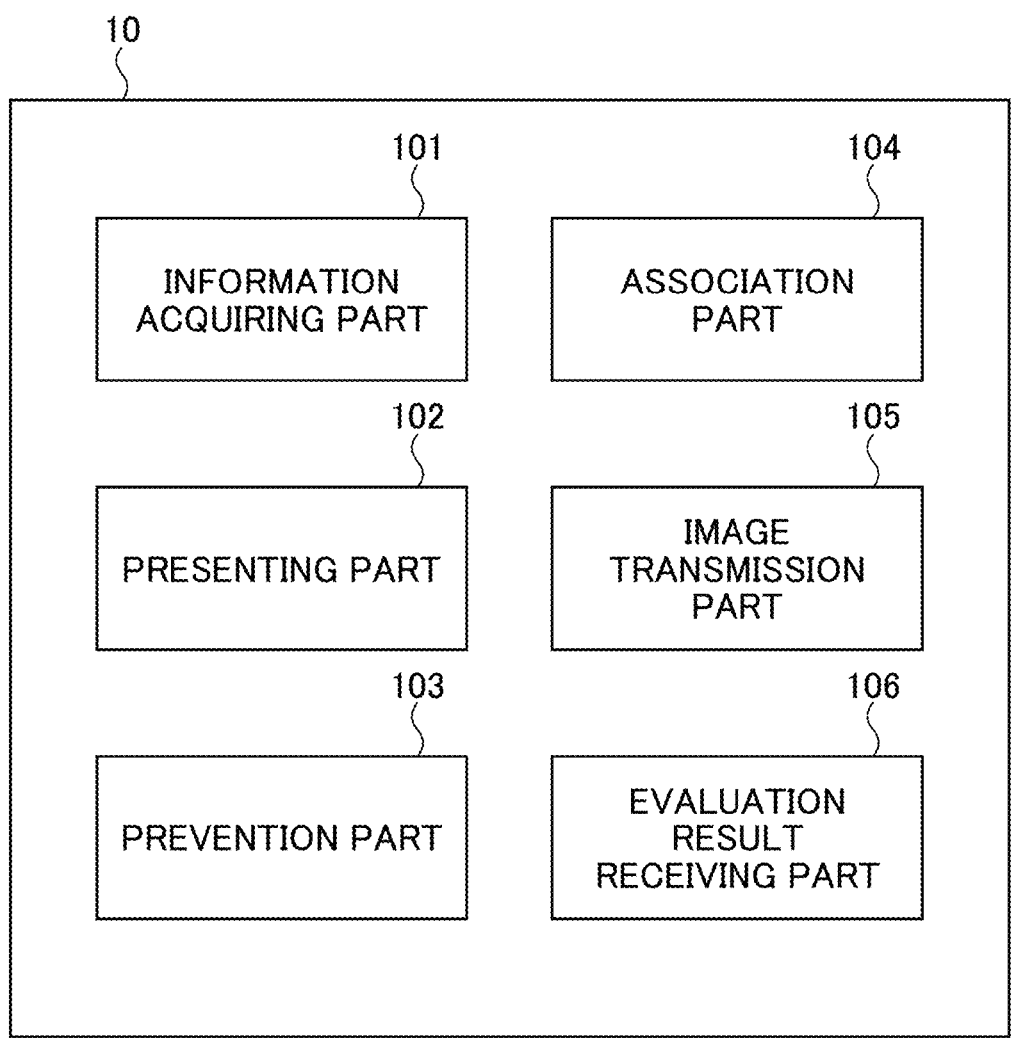
FIG. 2 is a functional block diagram of a photographing terminal according to one embodiment of the present disclosure.

FIG. 2 is a functional block diagram of the photographing terminal 10 according to one embodiment of the present disclosure. The photographing terminal 10 includes an information acquiring part 101 and a presenting part 102. Note that the photographing terminal 10 may be further provided with a prevention part 103, an association part 104, an image transmission part 105, and an evaluation result receiving part 106. Also, the photographing terminal 10 functions as an information acquiring part 101 and a presenting part 102 by executing a program. Note that the photographing terminal 10 can be configured to further function as a prevention part 103, an association part 104, an image transmission part 105, and an evaluation result receiving part 106, by executing a program. Each will be described below.

The information acquiring part 101 acquires an item to be photographed and the order in which this item is to be photographed. For example, the information acquiring part 101 receives the item to be photographed and the order in which this item is to be photographed, from the server 20.

The presenting part 102 presents the acquired item to be photographed and the order in which this item is to be photographed. The photographer 11 can select the presented item to be photographed, and takes a construction photo by the camera function of the photographing terminal 10. Hereinafter, the method of presentation will be described.

<<About Presentation>>

For example, the presenting part can display a plurality of items in the order in which these items are to be photographed. To be more specific, the presenting part can display, per equipment, a plurality of items in the order in which these items are to be photographed. To be more specific, the presenting part can display, per step, a plurality of items in the order in which these items are to be photographed.

Note that a list of all items may be displayed, or part of the items may be displayed dynamically (one by one).

For example, the presenting part 102 can present the item to be photographed next (for example, by displaying it, by outputting a sound, etc.). Furthermore, the presenting part 102 can present the item to be photographed next based on a presentation method in accordance with the use of images in which the item is photographed.

Note that the item to be photographed next may be presented before the previous item is photographed, may be presented while the previous item is being photographed, or may be presented after the previous item is photographed. Also, the item to be photographed next may be presented when the progress of taking photos is delayed compared to other equipment.

For example, the presenting part 102 can present an item, with the use of the image in which the item is photographed (for example, by displaying it, by outputting a sound, etc.).

For example, the presenting part 102 can present whether or not an item has been photographed (for example, by displaying it, by outputting a sound, etc.).

A plurality of presentation methods described above may be combined.

The prevention part 103 prevents items from being photographed in an order that is different from the order in which they are to be photographed. Hereinafter, the method of preventing this will be described.

<<About Prevention>>

For example, when the photographer 11 selects an unphotographed item and tries to photograph it, the prevention part 103 can present the fact that there is an item that is to be photographed before photographing the selected item but is not photographed yet (for example, by displaying it, by outputting a sound, etc.).

For example, when the photographer 11 selects an unphotographed item and tries to photograph it, and if there is an item that is to be photographed before photographing the selected item but is not photographed yet, the prevention part 103 can disable the camera function of the photographing terminal 10.

A plurality of prevention methods described above may be combined.

The association part 104 associates an item with an image in which the item is photographed.

The image transmission part 105 sends the images taken by the camera function of the photographing terminal 10 to the server 20.

The evaluation result receiving part 106 receives the evaluation results of the images stored in the server 20. For example, the evaluation result receiving part 106 can display the evaluation results on the photographed image.

<Functional Block of Registration Terminal 30>

Figure 3:
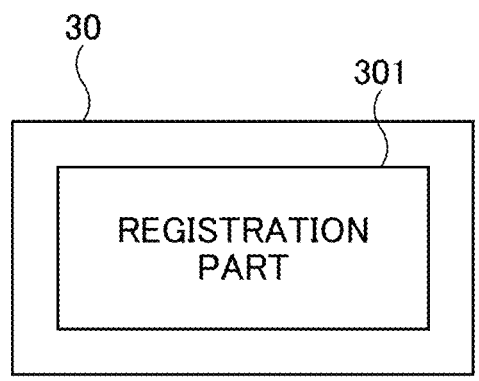
FIG. 3 is a functional block diagram of a registration terminal according to one embodiment of the present disclosure.

FIG. 3 is a functional block diagram of the registration terminal 30 according to one embodiment of the present disclosure. The registration terminal 30 includes a registration part 301. Also, the registration terminal 30 functions as a registration part 301 by executing a program. Below, this will be described in detail.

The registration part 301 sends, to the server 20, an item to be photographed and the order in which this item is to be photographed. For example, the registration part 301 sends, to the server 20, property information (for example, information about a property (for example, a building) where equipment such as an air conditioner is installed), the items to be photographed at that property, and the order in which these items are to be photographed, input by the registrant 31.

<Functional Block of Evaluation Terminal 40>

Figure 4:
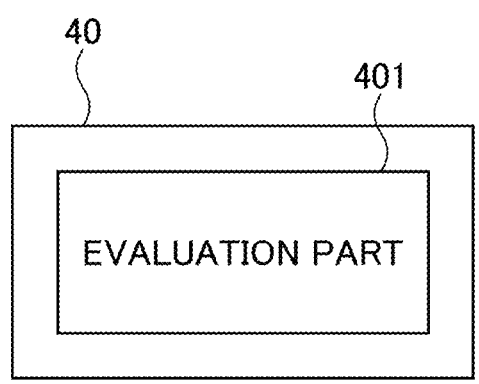
FIG. 4 is a functional block diagram of an evaluation terminal according to one embodiment of the present disclosure.

FIG. 4 is a functional block diagram of the evaluation terminal 40 according to one embodiment of the present disclosure. The evaluation terminal 40 includes an evaluation part 401. Also, the evaluation terminal 40 functions as an evaluation part 401 by executing a program. Below, this will be described in detail.

The evaluation part 401 evaluates the images taken by the photographing terminal 10 and stored in the server 20. The evaluation part 401 receives an image stored in the memory part 204 of the server 20, from the server 20. Also, the evaluation part 401 receives as input an evaluation result of the image received from the server 20, rendered by the image evaluator 41. Also, the evaluation part 401 sends the evaluation result of the image to the server 20.

<Functional Block of Server 20>

Figure 5:
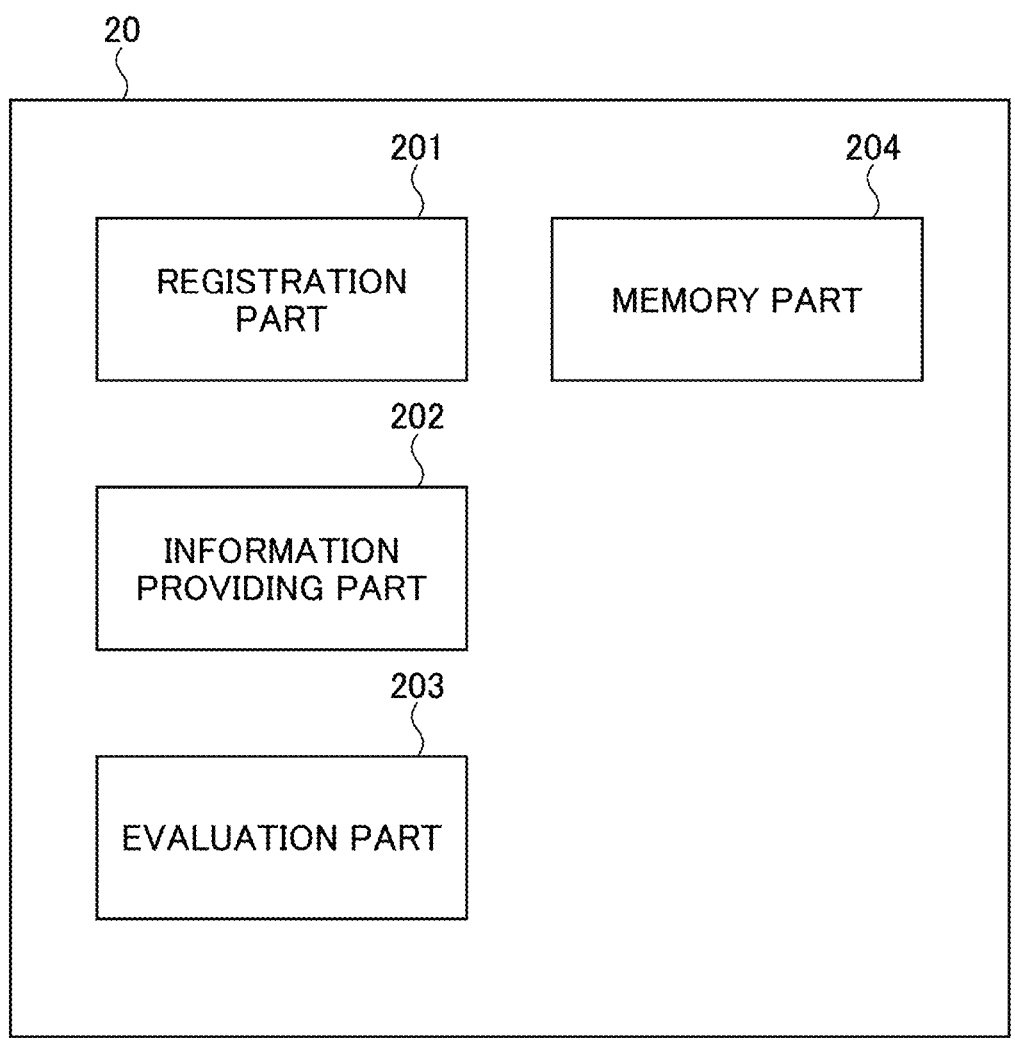
FIG. 5 is a functional block diagram of a server according to one embodiment of the present disclosure.

FIG. 5 is a functional block diagram of the server 20 according to one embodiment of the present disclosure. The server 20 includes a registration part 201, an information providing part 202, an evaluation part 203, and a memory part 204. Also, the server 20 functions as the registration part 201, the information providing part 202, and the evaluation part 203, by executing a program. Also, the memory part 204 is implemented by a memory device of the server 20 (for example, ROM 1002 of FIG. 12). Each will be described below.

The registration part 201 receives an item to be photographed and the order in which this item is to be photographed, from the registration terminal and stores this received item to be photographed and the order in which this item is to be photographed, in the memory part 204.

Also, the registration part 201 receives an image photographed by the photographing terminal 10 from the photographing terminal 10, and stores the received image in the memory part 204.

The information providing part 202 sends an item to be photographed and the order in which this item is to be photographed, to the photographing terminal 10. For example, the information providing part 202 sends, to the photographing terminal, an item to be photographed and the order in which the item is to be photographed, with regard to property information (for example, information about a property (for example, a building) where equipment such as an air conditioner is installed) specified from the photographing terminal 10.

The evaluation part 203 sends an image stored in the memory part 204 of the server 20, to the evaluation terminal 40. Also, the evaluation part 203 receives the evaluation result of the image from the evaluation terminal 40. Also, the evaluation part 203 reports the evaluation result of the image (for example, an evaluation result to indicate that the image needs to be re-photographed) to the photographing terminal 10.

In the memory part 204, the items to be photographed and the order in which the items are to be photographed are stored per property (for example, property (for example, building) where the equipment such as an air conditioner is installed). Also, the images taken by the photographing terminal 10 are stored in the memory part 204.

Note that the images taken by the photographing terminal 10 may have information of the photographer 11 so that the photographer 11 can be identified.

<<About Re-Photographing>>

According to one embodiment of this disclosure, when the image evaluator 41 determines that a construction photo needs to be re-taken, the photographing terminal 10 can acquire and present the item to be re-photographed and the order in which the item is to be re-photographed. To be more specific, when the registration part 201 of the server 20 receives an evaluation result to indicate that re-photographing is necessary from the evaluation terminal 40, the registration part 201 of the server 20 sends the item to be re-photographed and the order in which the item is to be re-photographed, to the photographing terminal 10. Also, the information acquiring part 101 of the photographing terminal 10 receives, from the server 20, the item to be re-photographed and the order in which this item is to be re-photographed. Also, the presenting part 102 of the photographing terminal 10 presents the item to be re-photographed and the order in which this item is to be re-photographed. For example, the presenting part 102 of the photographing terminal 10 can present the item to be re-photographed as the item to be photographed next (for example, by displaying it, by outputting a sound, etc.).

FIG. 6 is a diagram for explaining the order in which individual items are to be photographed, according to one embodiment of the present disclosure. Using the registration terminal 30, the registrant 31 registers, per property (for example, per property (for example, building) where equipment such as an air conditioner is installed), the items to be photographed with regard to that property and the order in which these items are to be photographed. As mentioned earlier, the items each indicate the photographing object (for example, construction object such as equipment) and in what stage of construction the photographing object is in.

The example of FIG. 6 shows the steps of construction for each equipment (equipment A, equipment B, and equipment C). These steps include, for example, step 1 (job of covering up the room), step 2 (job of removing the existing air conditioner), step 3 (job of installing a new air conditioner), and step 4 (job of removing the covering of the room). In this example, each item corresponds to a status of job in each step of construction (for example, before, during, and after each step). Using the registration terminal 30, the registrant 31 inputs the order in which individual items (1st to 33rd item in the example of FIG. 6) are to be photographed. Note that the registrant 31 can register an order in which the construction photos of all items can be taken efficiently.

Figure 7:
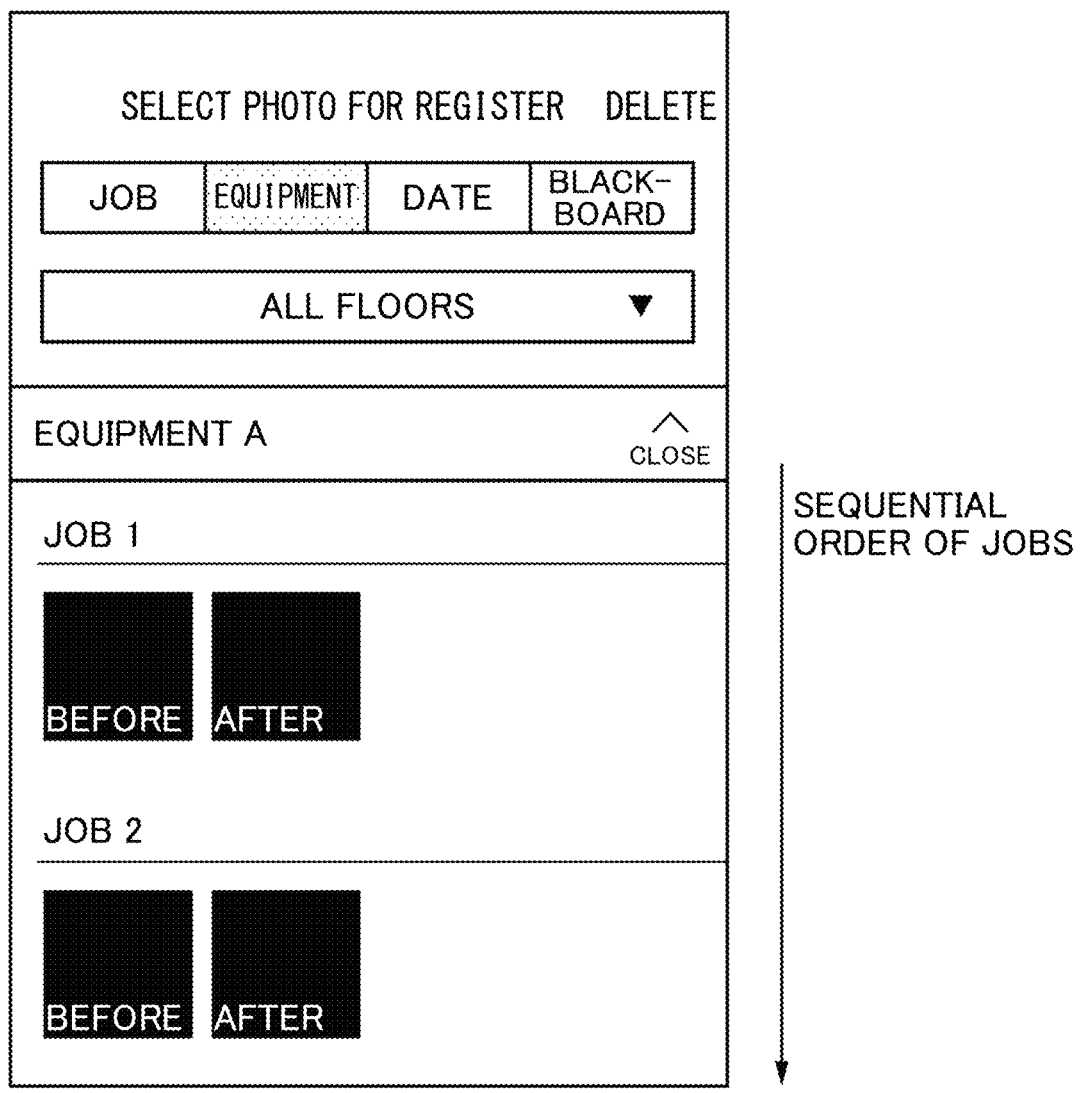
FIG. 7 is an example of a screen showing a plurality of items in the order the items are to be photographed, per equipment, according to one embodiment of the present disclosure.

FIG. 7 is an example of a screen showing a plurality of items in the order they are to be photographed, per equipment, according to one embodiment of the present disclosure. For example, the photographer 11 can display the screen of FIG. 7, on the photographing terminal 10, by selecting desired equipment among the equipment installation information displayed on the photographing terminal (for example, information to show the places where equipment such as an air conditioner is installed).

As shown in FIG. 7, for each equipment such as an air conditioner, the job stages of each step to be photographed are displayed in the order they are to be photographed (in the example of FIG. 7, before performing job 1, after performing job 1, before performing job 2, and after performing job 2).

Figure 8:
FIG. 8 is an example of a screen showing a plurality of items in the order the items are to be photographed, per step, according to one embodiment of the present disclosure.

FIG. 8 is an example of a screen showing a plurality of items in the order they are to be photographed, per step, according to one embodiment of the present disclosure. For example, the photographer 11 can switch between the screen of FIG. 7 and the screen of FIG. 8 displayed on the photographing terminal 10.

As shown in FIG. 8, for each step of construction, the job stages of each equipment to be photographed are displayed in the order they are to be photographed (in the example of FIG. 8, before working on equipment A, after working on equipment A, before working on equipment B, and after working on equipment B).

Figure 9:
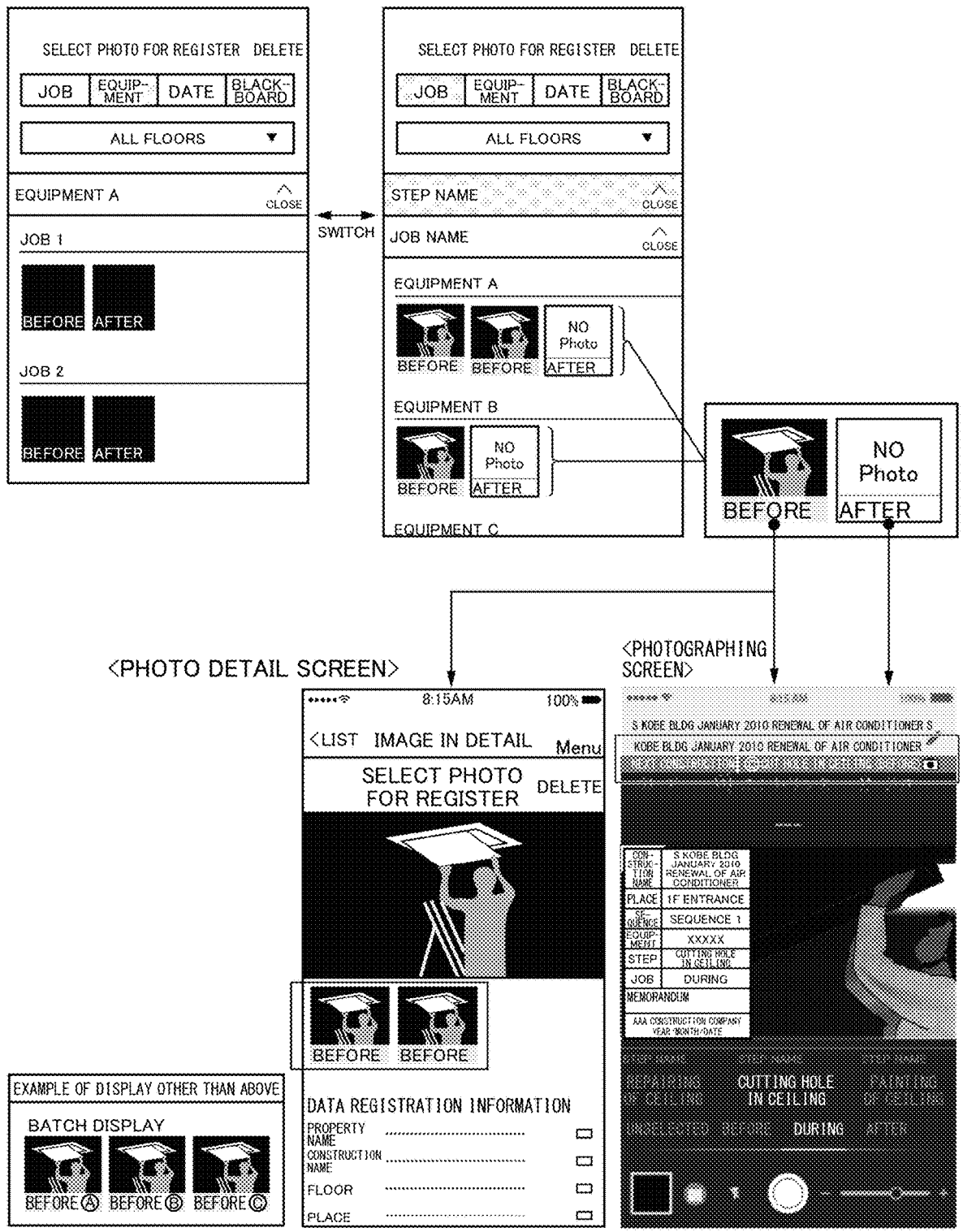
FIG. 9 is a transition diagram of a screen displayed on a photographing terminal according to one embodiment of the present disclosure.

FIG. 9 is a transition diagram of a screen displayed on the photographing terminal 10, according to one embodiment of the present disclosure.

The upper left part of FIG. 9 is an example of a <screen showing a plurality of items in the order they are to be photographed per equipment>, which has been described above with reference to FIG. 7. The upper right part of FIG. 9 is an example of a <screen showing a plurality of items in the order they are to be photographed per step>, which has been described above with reference to FIG. 8. As described above, the photographer 11 can switch between the screen of FIG. 7 and the screen of FIG. 8 displayed on the photographing terminal 10.

In the <screen showing a plurality of items in the order they are to be photographed per equipment> and the <screen showing a plurality of items in the order they are to be photographed per step>, each item is displayed such that the photographer 11 can identify between the items that are not photographed yet and the items that are already photographed. For example, in the space of an unphotographed item, an indication to the effect that the item's construction photo has not been taken yet (for example, "NO PHOTO") is displayed. In the space of a photographed item, a thumbnail of a construction photo that has been taken is displayed.

When an unphotographed item is selected by the photographer 11, the photographing terminal 10 activates the camera function of the photographing terminal 10 and displays a <photographing screen>, such as that shown in the lower right part of FIG. 9. For example, in the <photographing screen>, the item to be photographed next is displayed.

When a photographed item is selected by the photographer 11, the photographing terminal 10 displays a <photo detail screen>, such as that shown in the lower center part of FIG. 9. For example, in the <photo detail screen>, a construction photo taken, the construction information added to the construction photo, and so forth are displayed. Alternatively, when a photographed item is selected by the photographer 11, the photographing terminal 10 activates the camera function of the photographing terminal 10 for re-photographing the item, and displays a <photographing screen>, such as that shown in the lower right part of FIG. 9.

Also, each screen can differentiate an item from the other items. For example, as shown in the lower left part of FIG. 9, construction photos that are taken are displayed in a batch so that the photographer 11 can see the use of these construction photos (for example, these construction photos may be used to apply for subsidy benefits).

Also, each screen can indicate the fact that multiple construction photos have been taken with regard to one item. For example, the <photo detail screen> may display thumbnails of all construction photos taken.

<Processing Method>

FIG. 10 is a sequence diagram of the registration process, the photographing process, and the evaluation process, according to one embodiment of the present disclosure. Hereinafter, the registration process (steps 11 and 12), the photographing process (steps 21 to 25), and the evaluation process (steps 31 to 34) will be described separately.

<<Registration Process>>

In step 11 (S11), the registration terminal 30 sends, to the server 20, an item to be photographed and the order in which this item is to be photographed. For example, the registration terminal 30 sends, to the server 20, property information (for example, information about a property (for example, a building) where equipment such as an air conditioner is installed), an item to be photographed at that property, and the order in which that item is to be photographed, input by the registrant 31.

In step 12 (S12), the server 20 stores the item to be photographed and the order in which this item is to be photographed, received in S11, in the memory part 204 of the server 20. For example, the server 20 links the property information with the item to be photographed and the order in which this item is to be photographed, received in S11, and stores these in the memory part 204 of the server 20.

<<Photographing Process>>

In step 21 (S21), the server 20 sends an item to be photographed and the order in which this item is to be photographed, to the photographing terminal 10. For example, the server 20 sends, to the photographing terminal 10, an item to be photographed and the order in which this item is to be photographed, pertaining to property information that is specified by the photographing terminal 10 (for example, information about a property (for example, a building) where equipment such as an air conditioner is installed).

In step 22 (S22), the photographing terminal 10 presents the item to be photographed and the order in which this item is to be photographed, acquired in S21. For example, the photographing terminal 10 can display a plurality of items in the order they are to be photographed. Also, for example, the photographing terminal 10 can present the item to be photographed next (for example, by displaying it, by outputting a sound, etc.)

In step 23 (S23), the photographing terminal 10 takes a construction photo. To be more specific, the photographer 11 operates the photographing terminal 10 so that the item presented in S22 is photographed in the order presented in S22.

In step 24 (S24), the photographing terminal 10 sends the image taken in S22 to the server 20.

In step 25 (S25), the server 20 stores the image received in S24 in the memory part 204 of the server 20. For example, when the image is stored in the memory part 204 of the server 20, the server 20 can report that to the evaluation terminal 40.

<<Evaluation Process>>

In step 31 (S31), the server 20 sends the image stored in the memory part 204 of the server 20, to the evaluation terminal 40. For example, the server 20 sends the image to the evaluation terminal 40 in response to a request from the evaluation terminal 40.

In step 32 (S32), the evaluation terminal 40 receives as input the evaluation result of the image received in S31. For example, the evaluation terminal 40 receives as input the result of evaluation by the image evaluator 41.

In step 33 (S33), the evaluation terminal 40 sends the evaluation result of S32 to the server 20. For example, when the evaluation result is stored in the memory part 204 of the server 20, the server 20. can report that to the photographing terminal 10.

In step 34 (S34), the server 20 reports the evaluation result received in S33 to the photographing terminal 10. For example, the server 20 reports the evaluation result of the image (for example, an evaluation result to indicate that the image needs to be re-photographed) to the photographing terminal 10 in response to a request from the photographing terminal 10.

Note that, when it is determined that the image needs to be re-photographed, the photographing terminal 10 can acquire and present the item to be re-photographed and the order in which the item is to be re-photographed.

<<Presenting Process>>

FIG. 11 is a flowchart of the photographing order presenting process according to one embodiment of the present disclosure. The following process is performed as the photographing terminal 10 executes a program (for example, a smartphone application) that one embodiment of the present disclosure provides. The program (for example, a smartphone application) is installed in the photographing terminal 10 in advance.

In step 101 (S101), the information acquiring part 101 of the photographing terminal 10 acquires an item to be photographed. For example, the information acquiring part 101 of the photographing terminal 10 receives the item to be photographed, from the server 20. As mentioned earlier, the item indicates the photographing object (for example, a construction object such as equipment) and what stage of construction the photographing object is in.

In step 102 (S102), the information acquiring part 101 of the photographing terminal 10 acquires the order in which the item is to be photographed, acquired in S101. For example, the information acquiring part 101 of the photographing terminal 10 receives the order in which the item acquired in S101 is to be photographed, from the server 20.

Note that S101 may be performed after S102 is performed, or S101 and S102 may be performed at the same time.

In step 103 (S103), the presenting part 102 of the photographing terminal 10 presents the item to be photographed and the order in which these item is to be photographed, acquired in S101 and S102. For example, the presenting part 102 of the photographing terminal 10 can display a plurality of items in the order they are to be photographed. Also, for example, the presenting part 102 of the photographing terminal 10 can present the item to be photographed next (for example, by displaying it, by outputting a sound, etc.).

As described above, according to one embodiment of the present disclosure, the photographer can take all construction photos only by taking phots of the items presented on the photographing terminal, in the order presented.

<Hardware Configuration>

FIG. 12 is a block diagram showing an example hardware structure of the photographing terminal 10, the server 20, the registration terminal 30 and the evaluation terminal 40 according to one embodiment of the present disclosure. The photographing terminal 10, the server 20, the registration terminal 30, and the evaluation terminal 40 include a CPU (Central Processing Unit) 1001, a ROM (Read Only Memory) 1002, and a RAM (Random Access Memory) 1003. The CPU 1001, the ROM 1002, and the RAM 1003 constitute what is known as a computer.

Furthermore, the photographing terminal 10, the server 20, the registration terminal 30, and the evaluation terminal 40 can include a secondary memory device 1004, a display device 1005, an operating device 1006, an I/F (Interface) device 1007, and a drive device 1008. Note that the hardware of the photographing terminal 10, the server 20, the registration terminal 30, and the evaluation terminal are connected with each other via a bus B.

The CPU 1001 is an arithmetic-and-logic device that executes various programs installed in the secondary memory device 1004.

The ROM 1002 is a non-volatile memory. The ROM 1002 functions as a main memory device for storing various programs, data, and so forth that the CPU 1001 requires when executing various programs installed in the secondary memory device 1004. To be more specific, the ROM 1002 functions as a main memory device for storing, for example, boot programs such as BIOS (Basic Input/Output System), EFI (Extensible Firmware Interface), and so forth.

The RAM 1003 is a volatile memory such as a DRAM (Dynamic Random Access Memory), a SRAM (Static Random Access Memory), and so forth. The RAM 1003 functions as a main memory device to provide the work area that is expanded when various programs installed in the secondary memory device 1004 are executed on the CPU 1001.

The secondary memory device 1004 is a secondary memory device that stores various programs and information for use when various programs are executed.

The display device 1005 is a display device that displays the internal state of the photographing terminal 10, the server 20, the registration terminal and the evaluation terminal 40.

The operating device 1006 is an input device to allow the administrator of the photographing terminal 10, the server 20, the registration terminal 30, and the evaluation terminal 40 to input various commands in the photographing terminal 10, the server 20, the registration terminal 30, and the evaluation terminal 40.

The I/F device 1007 is a communication device for connecting with the network and communicating with the photographing terminal 10, the server 20, the registration terminal 30, the evaluation terminal 40, and so forth.

The drive device 1008 is a device for setting up the recording medium 1009. The recording medium 1009 referred to here includes a medium on which information is recorded optically, electrically, or magnetically, such as a CD-ROM, a flexible disk, a magneto-optical disk, and so forth. Furthermore, the recording medium 1009 may include a semiconductor memory or the like that records information electrically, such as an EPROM (Erasable Programmable Read Only Memory), a flash memory, and so forth.

Note that various programs are installed on the secondary memory device 1004 by, for example, setting a distributed recording medium 1009 in the drive device 1008, and reading various programs recorded on this recording medium 1009 by means of the drive device 1008. Alternatively, various programs to be installed in the secondary memory device 1004 may be downloaded from the network via the I/F device 1007.

Note that, as described above, the camera built in the photographing terminal 10 or the camera connected to the photographing terminal 10 is used to take construction photos. That is, the photographing terminal 10 may be configured to have a built-in camera (that is, the photographing terminal 10 and the camera are formed as one device), or the photographing terminal 10 may be connected with a camera (that is, the photographing terminal 10 and the camera are formed as separate devices).

Although an embodiment of the present disclosure has been described in detail, the present disclosure is by no means limited to the specific examples described herein, and various variations and modifications can be made within the scope of the herein-contained claims.

This application is based on and claims priority to Japanese Patent Application No. 2020-035937, filed with Japan Patent Office on Mar. 3, 2020, the entire contents of which are incorporated herein by reference.

REFERENCE SIGNS LIST 1 construction management system
10 photographing terminal
11 photographer
20 server
30 registration terminal
31 registrant
40 evaluation terminal
41 image evaluator
101 information acquiring part
102 presenting part
103 prevention part
104 association part
105 image transmission part
106 evaluation result receiving part
201 registration part
202 information providing part
203 evaluation part
204 memory part
301 registration part
401 evaluation part

The invention claimed is:

1. A non-transitory computer-readable recording medium having stored therein a program for causing a terminal to:
acquire an item indicating an object and a stage of construction and an order in which the object in the stage of the construction is to be photographed,
wherein the object is equipment,
wherein the stage of the construction is a step among steps of the construction, and
wherein the terminal displays a plurality of items based on the acquired order, per equipment or per step.

2. The non-transitory computer-readable recording medium having stored therein the program according to claim 1, wherein the terminal displays the plurality of items in the acquired order.

3. The non-transitory computer-readable recording medium having stored therein the program according to claim 1, wherein the terminal presents, together with the item, a use of an image in which the object is photographed.

4. The non-transitory computer-readable recording medium having stored therein the program according to claim 1, wherein the terminal presents an object to be photographed next.

5. The non-transitory computer-readable recording medium having stored therein the program according to claim 4, wherein the terminal presents the object to be photographed next based on a presentation method in accordance with a use of an image in which the object is photographed.

6. The non-transitory computer-readable recording medium having stored therein the program according to claim 1, further causing the terminal to prevent the object from being photographed in an order that is different from the order presented.

7. The non-transitory computer-readable recording medium having stored therein the program according to claim 1, further causing the terminal to associate the item with an image in which the object is photographed.

8. The non-transitory computer-readable recording medium having stored therein the program according to claim 1, wherein the terminal presents whether or not the object has been photographed.

9. The non-transitory computer-readable recording medium having stored therein the program according to claim 1, further causing the terminal to send an image in which the object is photographed, to a server.

10. The non-transitory computer-readable recording medium having stored therein the program according to claim 9, further causing the terminal to receive an evaluation result determined with regard to the image saved in the server.

11. The non-transitory computer-readable recording medium having stored therein the program according to claim 10, wherein, when it is determined that the object needs to be re-photographed, the terminal acquires an order in which the object is to be re-photographed.

12. The non-transitory computer-readable recording medium having stored therein the program according to claim 10,
wherein a notification is sent to a photographing terminal when the image in which the object is photographed is saved in the server, and
wherein a notification is sent to the photographing terminal when the evaluation result is saved in the server.

* * * * *